United States Patent Office 3,392,568
Patented July 16, 1968

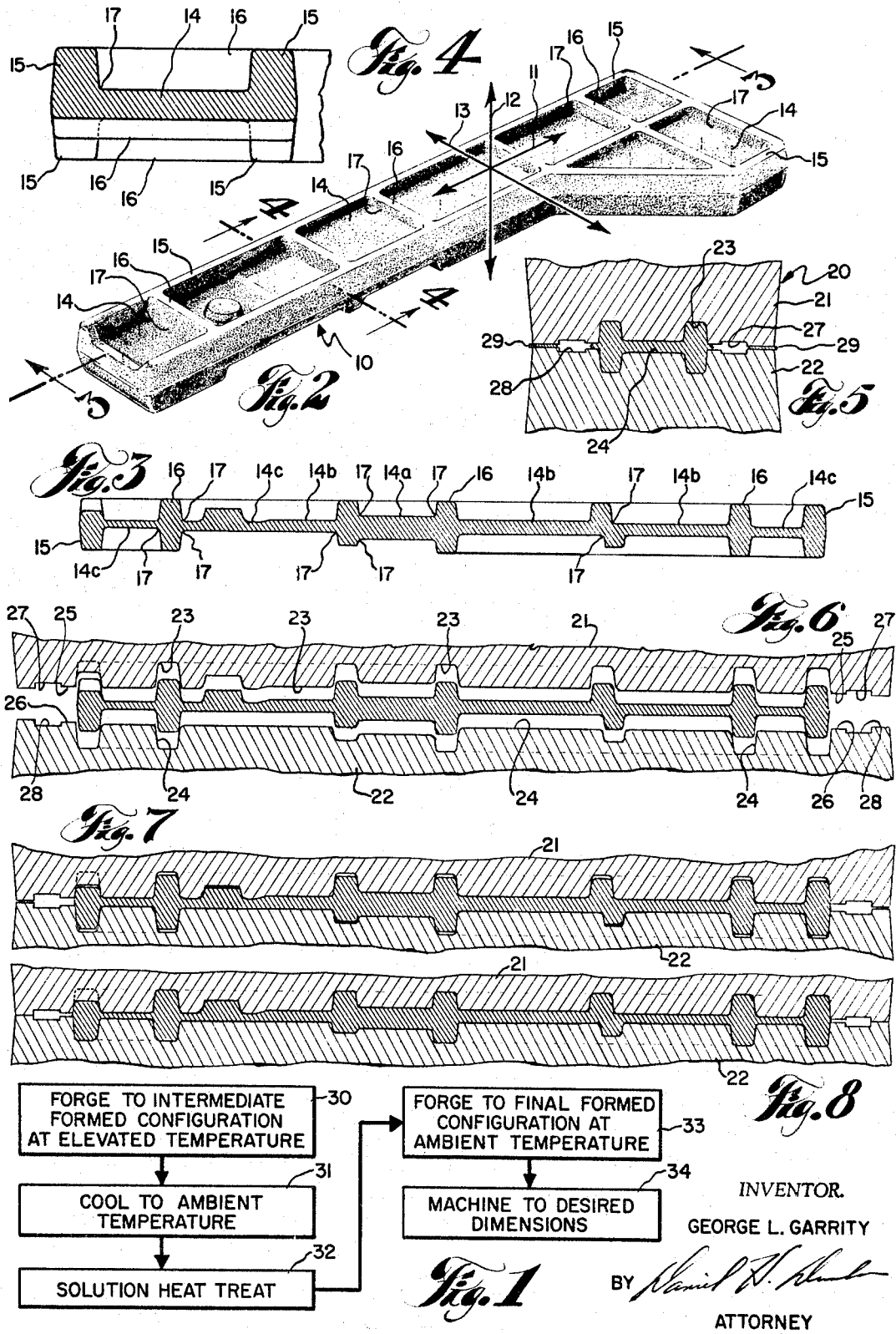

3,392,568
ALUMINUM ALLOY WORKPIECES
George L. Garrity, Granville, Ohio, assignor to North American Rockwell Corporation, a corporation of Delaware
Filed Mar. 23, 1966, Ser. No. 536,825
5 Claims. (Cl. 72—364)

ABSTRACT OF THE DISCLOSURE

A method of manufacturing a stress-relieved aluminum alloy closed die forging using the finish impression cavity of the die appartus for both hot-forming and stress-relieving operations with intermediate processing steps also being involved.

This invention relates generally to the manufacture of aluminum alloy workpieces, and particularly concerns a method for producing to-be-machined aluminum alloy forgings with significantly reduced residual stress concentrations. The invention has been utilized in connection with the manufacture of high-strength aluminum alloy structural members such as wing spars, attach panels, ejection seat rails, and the like for aircraft applications.

Considerable difficulty has heretofore been experienced in connection with the manufacture of aluminum alloy workpieces having forged web sections in a manner that eliminates serious workpiece warpage concurrent with final machining. Such warpage is generally caused by excessive residual stress concentrations in the forged workpiece and necessitates either or both extra machining and straightening to achieve the desired final configuration. By practicing the instant invention, however, it is possible to form high-strength aluminum alloy parts to a forged configuration having substantial webbed areas in a manner that requires only a normal final machining operation to produce the desired machined shape free of warpage. Generally, practice of the instant invention with respect to high-strength aluminum alloys results in the production of forged articles having residual stress concentrations that are on the average only one-third as great as the residual stress concentrations produced by conventional forging operations.

In the practice of the instant invention use is made of die blocks having a conventional construction and having metal-forming cavities that are shaped and dimensioned to essentially correspond to the shape and dimensions of the desired workpiece final-forged configuration. The necessary aluminum alloy billet, heated to a hot-forging temperature, is formed to a prescribed intermediate workpiece configuration using the die blocks in a heated condition; complete die block closure, in the conventional sense, does not occur in connection with this initial step. The partially-forged workpiece is afterwards solution heat-treated in accordance with conventional heat-treating practices. Following the heat-treatment operation, the workpiece is further forged to shape, but at ambient temperatures; use is made, in the additional forming operation, of the same die block apparatus but in an unheated condition. In this additional forming step the die blocks are brought to their conventional completely closed condition to thus provide the workpiece with the desired final-forged configuration. Afterwards, exterior surface metal is removed from the completely formed workpiece by machining the part to the dimensions required for the intended application.

Accordingly, the primary object of this invention is to provide a method of forming high-strength aluminum alloys parts having substantial web regions and adjoining rib regions of greater thickness with comparatively reduced residual stress concentrations, and consequently with improved configuration stability relative to an initially-machined condition.

Other objects and advantages of this invention will become apparent from a careful consideration of the specification and drawings.

In the drawings:

FIG. 1 is a flow diagram identifying the principal steps of this invention;

FIG. 2 is a perspective view of a workpiece formed in accordance with the method of this invention and having representative configuration characteristics;

FIGS. 3 and 4 are sectional views taken at lines 3—3 and 4—4 of FIG. 2, respectively;

FIG. 5 is a sectional view of portions of the conventional die apparatus used in the practice of this invention showing the relationship of such apparatus to a workpiece during hot-forging from a billet to a prescribed workpiece intermediate-formed configuration; and FIGS. 6 through 8 are sectional views of the die apparatus of FIG. 5 showing the relationship of such apparatus to the workpiece during ambient-temperature forging from the prescribed workpiece intermediate-formed configuration to the workpiece final-formed configuration.

In this specification frequent reference will be made to longitudinal, long transverse, and short transverse directions. Although such terms are generally well-understood, they may be better identified with reference to the workpiece 10 configuration shown in FIG. 2. The longitudinal direction is taken parallel to line 11 and generally parallels the major dimension of workpiece 10. Such direction also generally corresponds to the direction of material grain flow lines in the workpiece. The minimum workpiece dimension transverse to the longitudinal direction is identified as being parallel to the short transverse direction. This direction generally corresponds to the direction of line 12 of FIG. 2. The long transverse direction also is transverse to the longitudinal direction but is at right angles to the short transverse direction; such corresponds to the direction of line 13 and generally is parallel to the workpiece width.

Several general remarks may be made with respect to the composite configuration of workpiece 10. As shown in FIG. 2, workpiece 10 is basically comprised of web portions 14 and rib portions 15 and 16. Normally, a fillet 17 is provided in each region intermediate a web portion and an adjacent rib portion. Web regions 14 may be further classified according to thickness in the short transverse direction. In doing so use is made of the reference numerals 14a, 14b, and 14c in FIGURE 3. Web region 14a is comparatively thick; such, in the case of aircraft structural component forgings, typically has a maximum thickness dimension in the range of 1" to 1½". Web regions such as 14c are considered to involve a comparatively thin forged section and typically have a minimum dimension in the short transverse direction to as little as approximately ½". Those web regions designated as 14b are of medium or intermediate thickness. Workpiece 10 in the configuration of the drawings is provided with peripheral rib portions 15 that generally extend around the workpiece perimeter in joined relation. It should be noted that such joined peripheral ribs are not necessarily continuous about the workpiece plan extremes and need not have a uniform depth; such ribs, however, should exist at the longitudinal extremities of the part. In most instances the metal included in rib portions 15 is subsequently machined to provide required flange features and the like in the machined component. In typical applications for which the instant invention has heretofore been utilized the maximum total depth of rib portions 15 aligned in the short transverse direction has been as great as approximately 4". Rib portions 16 in workpiece 10 are also utilized in connection with the processing operations of this invention. In many instances such interiorly-located rib portions are an integral part of the component design; in some cases, however, a particular rib portion 16 may be added for processing purposes only and subsequently machined from the part. As suggested by the drawings, the instant invention has been practiced with respect to workpieces having rib portions that extend in the short transverse direction only to one side of web portions 14. Also, generally opposed transverse rib portions 16 need not be aligned in the short transverse direction when positioned on opposite sides of web portions 14. Further, this invention has been practiced in connection with workpieces having an overall length in the longitudinal direction to as great as approximately 12′ and having long transverse widths of as much as approximately 16″.

General remarks are also appropriate as to the die apparatus 20 that is preferably utilized in the practice of this invention. As shown in FIG. 5, the required apparatus is basically comprised of upper and lower conventional die block members 21 and 22. Such members are designed in a manner which permits their use in conventional forge press equipment of either the mechanical type or the hydraulic type. Such press equipment must necessarily be capable of developing the forces and pressures required for subsequent forging operations. Presses having ratings in the range of 1500 tons to 50,000 tons have been used in connection with the practice of this invention to date. As shown in the drawings, die block members 21 and 22 are provided with metal-forming cavities 23 and 24, respectively. Such cavities together have shape and dimension characteristics that correspond to the shape and dimension characteristics required of the configuration of the finally-forged workpiece. Accordingly, cavities 23 and 24 are provided with conventional size allowances for subsequent required metal removal, die scuffing, and the like. Each of internal cavities 23 and 24 is normally defined about its periphery by a die flash land 25 or 26. A die flash gutter 27 or 28 surrounds each die cash land 25 and 26 in the conventional manner. Normal forge die draft angles are provided in the rib-forming portions of die cavities 23 and 24 in most instances. Also, die block members 21 and 22 are generally designed for complete closure with approximately .0015″ to .0020″ separation between opposed faces in other than cavity and flash land and gutter regions. Thus, as used herein, complete die closure does not mean establishing intimate contact between members 21 and 22 but refers to the degree of die closure necessary for producing the web thickness desired in the workpiece finally-forged configuration. It also should be noted that members 21 and 22 may be fabricated of state-of-the-art die block materials such as hot-worked die steels and the like.

As previously suggested, this invention has heretofore been utilized in connection with the manufacture of workpieces fabricated of high-strength aluminum alloys. More partcularly, such use has involved the forging of workpieces from conventionally-designated 7079, 7075, and 2014 aluminum alloys. Although not presently known, the invention may also have application to other workpiece materials having generally similar characteristics relative to developing residual stress concentrations.

The principle steps of this invention are identified in blocks 30 through 34 of FIG. 1 of the drawings. For purposes of clarity, the individual operation in the combined sequence are herein described separately.

As indicated by block 30 of FIG. 1, the initial step in the sequence of operations constituting this invention involves forming a heated aluminum alloy billet of proper size and shape to a prescribed intermediate-forged configuration using conventional die apparatus also in a heated condition. This particular step utilizes die block members such as 20 and 21 that are preferably heated to a temperature in the range of approximately 400° F. to 600° F. The temperature of the required heated aluminum alloy billet, on the other hand, is a conventional hot-forging temperature and is typically in the range of 780° F. to 830° F. It is necessary that a sufficient force of pressure be applied to the heated die apparatus and contained heated billet to work the billet shape to a prescribed intermediate-formed configuration wherein the workpiece web regions 14 are forged to only within from approximately 101.5% to 104.0% of the desired final-forged configuration web thickness (on an ambient temperature basis), and generally preferably to within from 101.75% to 102.25%. If desired, die block closure in connection with the initial step may be controlled by means of properly sized kiss strips 29 such as are shown in FIG. 5.

The partially-formed workpiece is normally next cooled to ambient or room temperature. See block 31 of FIG. 1. Since the die apparatus may be utilized again in connection with the ambient-temperature forging step identified by block 33 of FIG. 1, such also should be cooled to room temperature. However, it is common practice to process other additionally required workpieces through the initial step of the process prior to using the die apparatus for the ambient-temperature forging step of the invention. If desired, the partially-formed workpiece produced in connection with the initial step may be directly processed through the required subsequent solution heat-treating operation without intermediate cooling.

As indicated by block 32 of FIG. 1, the partially-formed workpiece is next subjected to solution heat-treating. Standard heat-treating equipment and procedures are preferred in connection with this step. Normally, the partially-formed workpiece is heated in a compatible environment having a temperature in the range of 820° F. to 875° F., maintained in the environment a sufficient time to attain the elevated temperature completely throughout, and afterwards quenched to ambient temperature. The period of time may typically vary from a minimum of 90 minutes to a maximum of 2 hours depending on the type of furnace equipment utilized and the thickness of the forging involved. In the case of 7079 aluminum alloy, a typical aircraft structural forging is heated to a temperature of 860° F.±10° F. in conventional salt bath equipment and maintained at that temperature approximately 90 minutes; if maximum workpiece thicknesses of 1½″ are involved, the heat-treatment operation may involve subjecting the part to the elevated temperature environment for as long as 2 hours as when air furnace equipment is utilized. Following heating, the part is normally quenched in water to room temperature to complete the solution heat-treating process. Room temperature water is generally satisfactory for 7079 alloy, tempered water having a temperature in the range of 140° F. to 160° F. is generally preferred for 7075 and 2014 alloys, however.

The next step in the process of this invention is identified with reference to block 33 of FIG. 1. As indicated therein, the partially-formed, heat-treated aluminum alloy forging workpiece is additionally formed to the desired final-forging configuration but at ambient (room) temperature. For reasons of economy, it is preferred that the previously-employed die apparatus be utilized in the practice of this step; such apparatus should have an ambient temperature when so used. As shown by FIG. 6, the partially-formed workpiece only nominally contacts the cavity surfaces of die blocks 21 and 22 prior to the additional forming action. This condition exists because different thermal expansion/contraction coefficients and degrees of total shrinkage exist as between the partially-formed workpiece and the die apparatus and as between the temperature conditions of the first step and subsequent ambient temperatures. As the draft surfaces of the cavities 23 and 24 in die blocks 21 and 22 are brought into engagement with ribs 15 and 16 of workpiece 10, FIG. 7, various elongation occurs with respect to the metal located in web regions 14. Normally, initial die contact occurs with respect to peripheral ribs 15 and thus, stretching is likely to occur first in thinner web sections and in the longitudinal and long transverse sections most distant from the workpiece center region. As the die blocks are additionally advanced toward each other from die block-workpiece initial contact, stretching is in turn imparted to more centrally-located web regions. Interiorly-located transverse ribs 16 often additionally function to limit the degree of elongation imparted to particular web regions and are desirably located at regions of substantial web thickness change. It is desirable, in fact, to provide a substantial transverse rib 16 in the central region of the forging workpiece for locating and reference purposes. In a typical application the degree of longitudinal and long transverse elongation that is achieved in the practice of this invention is in the range of 0.25% to 1.00% of the partially-formed workpiece total length or width, as applicable. The lower limit is permissible as metal removal requirements are reduced. Continued closing of the die blocks to the FIG. 8 final condition compresses the metal in the web regions 14 and fillet regions 17 in a short transverse direction and from its initial thickness value in the range of 101.5% to 100.4% of the desired web thickness to the desired final web thickness. As previously suggested, the further compression may involve reducing the web thickness from a preferred initially-formed value in the range of 101.75% to 102.25% of the desired final web thickness. By sequentially stretching and then compressing the workpiece metal located in web portions 14 and fillet regions 17, a significant reduction of workpiece residual stress concentrations is accomplished. In some instances the completely closed die condition is maintained for at least 15 seconds to accomplish a setting action and eliminate the degree of spring-back that might otherwise occur.

Lastly, the finally-forged workpiece is machined to the desired dimensions and finishes. See block 34 of FIG. 1. Conventional machining practices are preferred for accomplishing this step but such are required at a reduced level in comparison to conventional aircraft-quality forgings. As previously suggested, only final cuts are required to finish the workpiece for the reason that serious warpage is not present in parts processed in accordance with this invention.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

I claim:
1. In a method of forming an aluminum alloy workpiece to a final-forged configuration comprised of at least one web region having a prescribed thickness and rib regions adjoining said web region and having prescribed plan locations and comparatively greater thicknesses, the combined steps of:
    (a) hot-forging a heated aluminum alloy workpiece having a temperature in the range of from 780° F. to 830° F. in die apparatus having a temperature in the range of from 400° F. to 600° F. and to an intermediate-forged configuration wherein said web region has a thickness, on an ambient temperature basis, in the range of from 101.5% to 104.0% of said workpiece final-forged configuration web region prescribed thickness and wherein said rib regions are located, on an ambient temperature basis and relative to the workpiece plan center, in the range of from 99.0% to 99.75% of said workpiece final-forged configuration rib region prescribed plan locations,
    (b) solution heat-treating said hot-forged workpiece, and
    (c) further forging said solution heat-treated, hot-forged workpiece at ambient temperatures in said die apparatus at ambient temperatures to said final-forged configuration wherein said web region has a thickness corresponding to said web region prescribed thickness and wherein said rib regions have locations, relative to the workpiece plan center, corresponding to said rib region prescribed plan locations.

2. The invention defined by claim 1, said heated workpiece being hot-forged to an intermediate-forged configuration wherein said web region has a thickness, on an ambient temperature basis, in the range of from 101.75% to 102.25% of said workpiece final-forged configuration web region prescribed thickness.

3. The invention defined by claim 2, said heated workpiece being hot-forged to an intermediate-forged configuration wherein said rib regions are located, on an ambient temperature basis and relative to the workpiece plan center, in the range of from 99.2% to 99.4% of said workpiece final-forged configuration rib region prescribed plan locations.

4. In a method of forming an aluminum alloy workpiece to a final-forged configuration comprised of at least one web region having a prescribed thickness and rib regions adjoining said web region and having prescribed plan locations and comparatively greater thickness, the combined steps of:
    (a) hot-forging a heated aluminum alloy workpiece having a temperature in the range of from 780° F. to 830° F. in die apparatus having a temperature in the range of from 400° F. to 600° F. and to an intermediate-forged configuration wherein said web region has a thickness, on an ambient temperature basis, in the range of from 101.5% to 104.0% of said workpiece final-forged configuration web region prescribed thickness and wherein said rib regions are located, on an ambient temperature basis and relative to the workpiece plan center, in the range of from 99.0% to 99.75% of said workpiece final-forged configuration rib region prescribed plan locations,
    (b) solution heat-treating said hot-forged workpiece,
    (c) stretching said web region at ambient temperatures in a direction transverse to the direction of said workpiece final-forged configuration web region prescribed thickness by means of said die apparatus at ambient temperatures contacting said rib regions and moving said rib regions to plan locations corresponding to said workpiece final-forged configuration rib region prescribed plan locations, and
    (d) compressing said web region at ambient temperatures in a direction parallel to the direction of said workpiece final-forged configuration web region prescribed thickness by means of said die apparatus at ambient temperatures contacting said web region and working said web region to a thickness corresponding to said workpiece final-forged configuration web region prescribed thickness.

5. The invention defined by claim 4, said heated workpiece being hot-forged to an intermediate-forged configuration wherein said web region has a thickness, on an ambient temperature basis, in the range of 101.75% to 102.25% of said workpiece final-forged configuration web region prescribed thickness and wherein said rib regions are located in plan, on an ambient temperature basis and relative to the workpiece plan center, in the range of from 99.2% to 99.4% of said workpiece final-forged configuration rig region prescribed plan locations.

References Cited

UNITED STATES PATENTS

| | | | |
|---|---|---|---|
| 2,726,972 | 12/1955 | Corral | 148—11.5 |
| 3,007,427 | 11/1961 | Bryan et al. | 148—11.5 |
| 3,264,716 | 8/1966 | Silver | 29—420.5 |

RICHARD J. HERBST, *Primary Examiner.*